Figure 1:
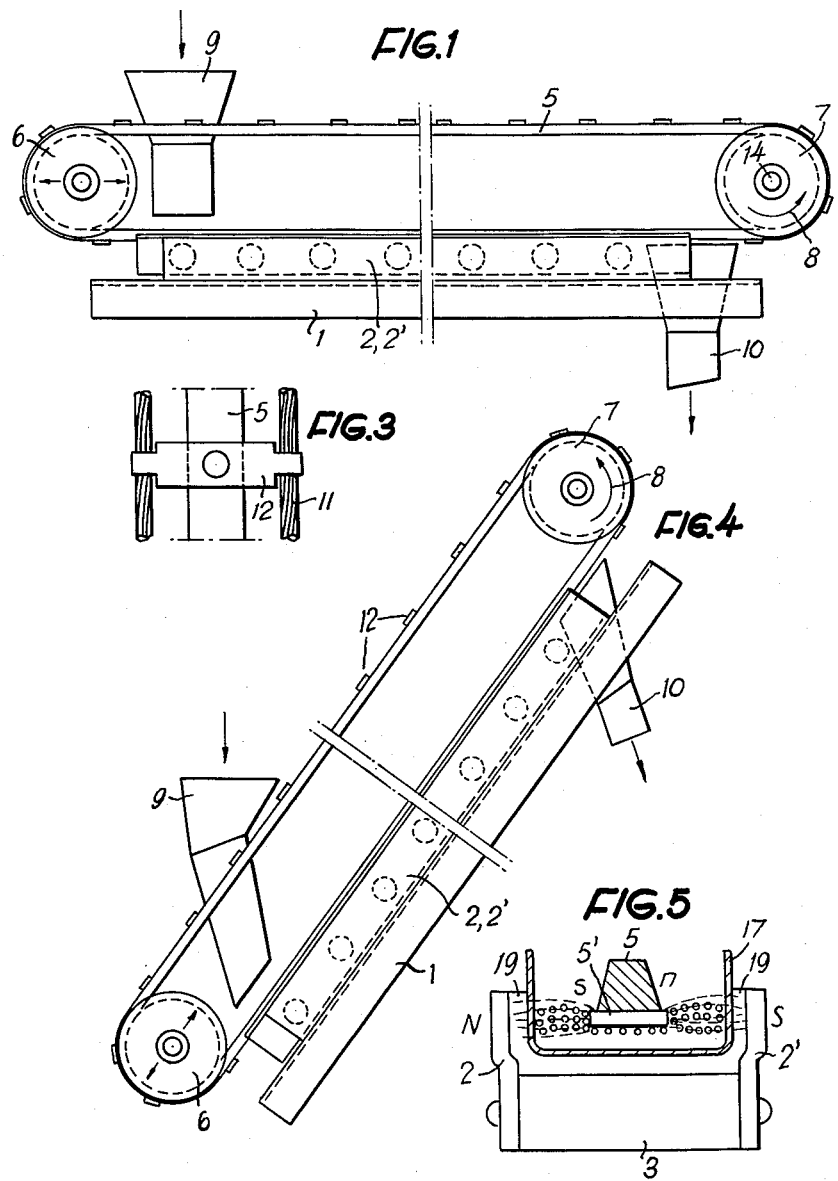

Jan. 12, 1965 S. J. ALFREDÉEN 3,165,196
MAGNETIZABLE CONVEYOR
Filed Jan. 24, 1963 2 Sheets-Sheet 1

INVENTOR.
SVEN JOHAN ALFREDÉEN
BY
Young + Thompson
ATTYS.

United States Patent Office 3,165,196
Patented Jan. 12, 1965

3,165,196
MAGNETIZABLE CONVEYOR
Sven Johan Alfredéen, Enskede, Sweden, assignor to Aktiebolaget Superior, Sundbyberg, Sweden, a corporation of Sweden
Filed Jan. 24, 1963, Ser. No. 253,600
Claims priority, application Sweden, May 21, 1962, 5,703/62
6 Claims. (Cl. 198—41)

This invention relates to magnetizable conveyors for transporting magnetic articles, especially cast iron shot or pellets or the like for soot removers of the shot cleaning type, comprising an endless conveying member extending around pulleys or the like and running through part of its length in a magnetic field.

In magnetizable conveyors of this type it is known to devise the conveying member in the form of an endless band of non-magnetic material which through part of its length runs on bars acting as pole shoes of electromagnets, the articles to be conveyed being attracted by the band and conveyed thereby. In this construction the band has to be kept in very tightly stretched condition between the driving and guide pulleys around which the band extends. Further, the band must be of small thickness in view of the fact that the magnetic field is considerably weakened as the distance from the magnetic poles increases. It is also known to devise the conveying member in the form of cables of magnetizable material passing through a magnetic field around a conduct or through which an electric current produced by a generator is passed. However, this construction requires high operating costs, especially because the generator during operation of the conveyor continuously has to produce a current the intensity of which depends on the weight of the articles to be conveyed.

The object of the invention is to provide a magnetizable conveyor which does not suffer from the above inconveniences and is especially suited for conveying mass-produced articles, such as shot or pellets for soot removers of the shot cleaning type for cleaning the heating surfaces of economizers, steam boilers and the like.

In its broadest aspect the invention is characterized in that the conveying member consists of or comprises a magnetizable material so that secondary magnetic poles are generated in the conveying member by magnetic induction during its passage in the magnetic field, which secondary poles attract and retain the articles during transportation whereupon the articles are released after having left the magnetic field. A difficulty in such a magnetizable conveyor consists in that the material to be conveyed tends to be attracted toward the magnetic poles which generate the magnetic field and which hereinbelow are termed primary magnetic poles. This difficulty can be eliminated by the provision of a preferably stationary partition which separates the conveying member and the articles conveyed thereby from the primary magnetic poles, which partition is located at a sufficient distance from the respective poles. However, too great a distance would weaken the magnetic field to be generated between the primary magnetic poles and the secondary poles on the conveying member. If the air gaps between the primary magnetic poles and the partition are suitably adapted the material to be conveyed will be effectively prevented from being attracted to, and retained by, the partition. Instead, the material to be conveyed will be attracted by the secondary magnetic poles which are generated by magnetic induction in the conveying member which consequently will transport the material in an effective manner.

If the partition is in the form of a trough in which the conveying member runs at a distance from the bottom and side walls of the trough the shot or pellets can be brought during transportation substantially entirely to fill up the space between the conveying member and the walls of the trough such that the material to be conveyed will come into contact with said walls at least at certain places thereon during transportation, resulting in relative movements amongst the articles to be conveyed which is of special advantage in transporting cleaning members used in soot removers of the shot cleaning type because of the fact that these members will be subjected to a certain cleaning action.

The conveying member may consist of a flexible band-shaped or belt-shaped element of non-magnetic material having attached pieces of magnetizable material or entirely of a magnetizable material, such as in the form of a stranded wire or a chain composed of links. In such an arrangement the conveying member need not be very tightly stretched between the driving and guide pulleys since a slight movement in the lateral direction or toward and away from the bottom of the trough is of advantage because such movements increase the possibility of contact between the material to be conveyed and the wall of the trough during transportation and also increase the relative movement amongst the articles to be conveyed so as to enhance the cleaning effect.

Figure 2:
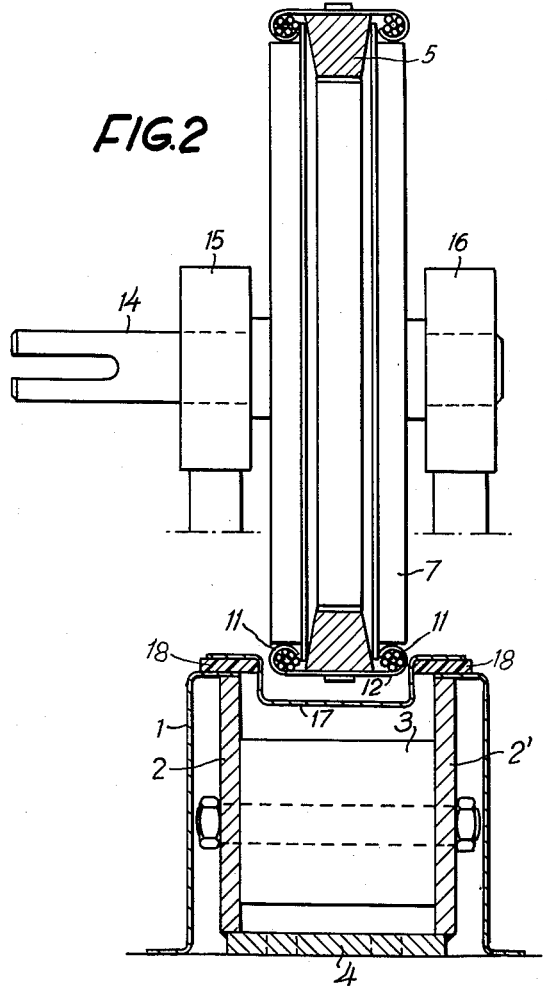

Several examples of embodiments of the invention are illustrated in the annexed drawing, in which:

FIG. 1 shows a lateral elevation of a horizontal conveyor, FIG. 2 a vertical sectional view thereof taken at a pulley, FIG. 3 a partial top view of the conveying member, FIG. 4 a conveyor devised as an elevator, and FIG. 5 a cross-sectional view of a modification, all of these views being views of embodiments of the present invention.

Between two parallel lonngitudinal pole bars 2, 2' mounted on or in a frame 1 there are provided a plurality of permanent magnets 3 having unidirected poles such that a north pole is provided on the bar 2 and a south pole on the other bar 2'. Consequently, a magnetic field extends between the pole bars 2 and 2' along the entire length thereof. Instead of permanent magnets electromagnets may be provided between the pole bars for producing the magnetic field. The rigidity and stability of the magnet system can be increased by a plate 4 which should be of a non-magnetizable material and interconnects the lower edges of the pole bars 2, 2'. Extending through the magnetic field generated between the pole bars 2 and 2' is a conveying member which, as shown in FIG. 2, consists of a V-belt 5 having attached thereto pieces of soft magnetic material. According to FIG. 2 the soft magnetic material is in the form of a pair of soft-iron cables 11 attached to the V-belt 5 by means of transverse carriers 12 provided in suitably spaced apart relation along the length of the V-belt. The V-belt is endless and extends around two pulleys 6 and 7. The pulley 6 is displaceable toward and away from the pulley 7 so as to enable the belt to be stretched. The driving pulley 7 is keyed on a drive shaft 14 mounted in bearings 15 and 16. The pulley 7 rotates in the direction of the arrow 8 and imparts to the lower run of the conveying member a movement from the left to the right, as viewed in FIG. 1. A feed hopper 9 for the supply of the material to be conveyed is provided laterally of the conveyor such that its outlet end is located slightly above the lower run of the conveying member at the left-hand ends of the pole bars 2, 2' as viewed in FIG. 1. A collecting funnel 10 for the material conveyed is provided below the conveying member at the right-hand ends of the pole bars.

In the magnetic field between the longitudinal top edges of the pole bars 2, 2' there is provided a partition in the form of a trough 17 of non-magnetizable material, the edges of the trough being supported by the frame 1 by means of suitable pads 18 (FIG. 2).

As clearly illustrated in FIG. 5 the permanent magnets 3 produce primary magnetic poles at the longitudinal top edges of the pole bars 2, 2' such as a north pole N on the pole bar 2 and a south pole S on the pole bar 2'. At the opposite edges of the pieces 5' consisting of a magnetic material, such as soft iron, there are generated seconndary poles $s$ and $n$. The magnetizable articles to be conveyed, such as cast iron shot falling through the feed hopper 9 down into the trough 17 will be attracted by the soft iron pieces 5' and moved along therewith during movement of the conveying member toward the outlet funnel 10. Between the sides of the pole bars 2, 2' and the corresponding adjacent walls of the trough 17 there are provided air gaps 19 which are large enough to prevent the articles to be conveyed from being attracted toward, and getting stuck to, the walls of the trough 17 instead of following along with the conveying member. If the articles to be conveyed consist of shot or pellets for soot removers of the shot cleaning type they are suitably supplied in an amount such as during transportation to be able to come into contact with the walls of the trough at least at certain places, resulting in relative movements amongst the shot of the conveyed material. Due to such movements impurities in the form of soot or the like on the surfaces of the shot will be removed therefrom. The removed impurities can be exhausted by suction or otherwise removed from the trough 17.

A plurality of rows of soft iron pieces may be provided in parallel relation along the V-belt or, as shown in FIG. 2, soft-iron cables may be used or soft-iron chains or the like in which case a plurality of secondary poles will be generated in the magnetic field between the pole bars. The mode of operation is essentially the same as described with reference to FIG. 5.

The magnetizable conveyor may be used for vertical transportation equally well as the horizontal conveyor described or for transportation along an incline. An example of a sloping conveyor or elevator is illustrated in FIG. 4. With a suitable slope, impurities or other non-magnetizable materials which during transportation from the feed hopper 9 to the outlet funnel 12 have been separated and dropped to the bottom of the trough can slide along the bottom to the lower end thereof and be removed from the conveyor.

What is claimed is:

1. A conveyor for transporting magnetizable articles from a loading station to a discharge station, comprising an endless conveying member, means for circulating said conveying member between said loading and discharge stations, said conveying member extending along a portion of the length thereof between said loading and discharge stations, stationary magnet means mounted adjacent said portion of the conveying member between said loading and discharge stations and comprising primary magnetic poles for generating a magnetic field, said conveying member comprising magnetizable material thereby to provide secondary poles in said magnetic field to cause attraction of said magnetizable articles at the loading station for their conveyance to the discharge station, and partition means extending between said magnet means and said conveying member substantially along the portion of the conveying member which is disposed between the loading station and the discharge station and mechanically separating said primary poles from said secondary poles.

2. A conveyor as claimed in claim 1, said primary poles being spaced from said partiton means to form air gaps reducing the attraction of the articles to the primary poles.

3. A conveyor as claimed in claim 1, in which the partition means is channel-shaped to form a trough having a bottom and longitudinal side walls, the conveying member being disposed in the trough in spaced relation to said bottom and side walls.

4. A conveyor as claimed in claim 1, in which the conveying member comprises a flexible band of non-magnetizable material having pieces of soft iron attached thereto.

5. A conveyor as claimed in claim 1, in which the conveying member comprises an endless cable of wires of a magnetizable material.

6. A conveyor as claimed in claim 1, in which the conveying member comprises a chain of magnetizable material.

References Cited by the Examiner
UNITED STATES PATENTS

| | | | |
|---|---|---|---|
| 2,192,647 | 3/40 | McArthur et al. | 198—41 X |
| 2,857,059 | 10/58 | Goerlich et al. | 198—38 X |
| 2,881,901 | 4/59 | Zimmer | 198—41 |
| 3,120,891 | 2/64 | Cmiel | 198—41 |

ROBERT B. REEVES, *Acting Primary Examiner.*

WILLIAM B. LA BORDE, *Examiner.*